(12) United States Patent
Glaser et al.

(10) Patent No.: US 8,140,919 B2
(45) Date of Patent: Mar. 20, 2012

(54) DISPLAY OF DATA USED FOR SYSTEM PERFORMANCE ANALYSIS

(75) Inventors: Howard Justin Glaser, San Jose, CA (US); Daiv Santos Barrios, San Jose, CA (US); Matthew Wayne Novak, San Jose, CA (US); Chenhong Xia, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 11/872,168

(22) Filed: Oct. 15, 2007

(65) Prior Publication Data

US 2009/0100440 A1 Apr. 16, 2009

(51) Int. Cl.
*G06F 11/00* (2006.01)

(52) U.S. Cl. ............ 714/57; 714/38.1; 714/48; 719/318

(58) Field of Classification Search .............. 714/57, 714/38, 38.1; 719/318
See application file for complete search history.

(56) References Cited

U.S. PATENT DOCUMENTS

| | | | |
|---|---|---|---|
| 5,847,972 A | 12/1998 | Eick et al. | |
| 5,961,596 A | 10/1999 | Takubo et al. | |
| 6,704,012 B1 | 3/2004 | Lefave | |
| 6,836,894 B1 | 12/2004 | Hellerstein et al. | |
| 7,039,702 B1 * | 5/2006 | Churchyard | 709/224 |
| 7,281,112 B1 * | 10/2007 | Gross et al. | 711/170 |
| 7,774,790 B1 * | 8/2010 | Jirman et al. | 719/318 |
| 2002/0052820 A1 * | 5/2002 | Gatto | 705/36 |
| 2002/0099815 A1 * | 7/2002 | Chatterjee et al. | 709/224 |
| 2002/0138791 A1 * | 9/2002 | Durrant et al. | 714/43 |
| 2003/0126509 A1 | 7/2003 | Kaler et al. | |
| 2003/0140280 A1 * | 7/2003 | Kaler et al. | 714/37 |
| 2004/0054776 A1 * | 3/2004 | Klotz et al. | 709/224 |
| 2004/0068560 A1 * | 4/2004 | Oulu et al. | 709/224 |
| 2004/0250261 A1 * | 12/2004 | Huibregtse | 719/318 |
| 2005/0005202 A1 * | 1/2005 | Burt et al. | 714/47 |
| 2005/0223264 A1 * | 10/2005 | Arden et al. | 714/4 |
| 2006/0048101 A1 * | 3/2006 | Krassovsky et al. | 717/127 |
| 2006/0072583 A1 * | 4/2006 | Sanda et al. | 370/395.53 |
| 2006/0248401 A1 * | 11/2006 | Carroll et al. | 714/38 |

OTHER PUBLICATIONS

Eagle et al., Technique for Graphically Displaying Application Processing Time Distributions in Real-Time, U.S. Appl. No. 11/829,221, filed Jul. 27, 2007.

* cited by examiner

*Primary Examiner* — Scott Baderman
*Assistant Examiner* — Chae Ko
(74) *Attorney, Agent, or Firm* — Doug H. LeFeve; SVL: IP Law Edell, Shapiro & Finnan, LLC (57) ABSTRACT

Method, system, and computer program product for displaying data used to analyze system performance are provided. The method, system, and computer program product provides for determining an alert was triggered in a system at a point in time, identifying an alert type associated with the alert that was triggered in the system at the point in time, and displaying data concerning the system based on the alert type identified, the data displayed comprising a subset of a plurality of types of data available concerning the system, the subset being selected based on the alert type identified.

25 Claims, 5 Drawing Sheets

DISPLAY OF DATA USED FOR SYSTEM PERFORMANCE ANALYSIS

FIELD OF THE INVENTION

The present invention relates generally to displaying data used to analyze system performance.

BACKGROUND OF THE INVENTION

In large software runtime environments, such as, server environments, it is often difficult to diagnose problems in a system because any number of seemingly unrelated factors may interact and result in performance issues or system failure. Information useful in diagnosing system problems, such as logs, performance measurements, and so forth, may also be scattered in a variety of places. Additionally, less experienced users may not know which types of information are relevant for a particular system problem. Diagnosing system problems is further complicated by the fact that information necessary for diagnosis may need to be viewed using multiple viewers that are unlikely to be synchronized. Hence, a big picture view of what was happening in the system when a particular problem occurred will not be available.

SUMMARY OF THE INVENTION

Method, system, and computer program product for displaying data used to analyze system performance are provided. The method, system, and computer program product provides for determining an alert was triggered in a system at a point in time, identifying an alert type associated with the alert that was triggered in the system at the point in time, and displaying data concerning the system based on the alert type identified, the data displayed comprising a subset of a plurality of types of data available concerning the system, the subset being selected based on the alert type identified.

The display of data concerning the system comprises displaying data concerning the system based on the alert type identified for a window of time in one implementation. Each type of data displayed may also be time synchronized. In response to a piece of the data displayed concerning the system being highlighted, details regarding the piece of data that is highlighted may be displayed.

In one implementation, the plurality of types of data available concerning the system includes information relating to processor(s), information relating to transaction(s), information relating to page(s), information relating to cache(s), information relating to log(s), information relating to command(s), information relating to throughput, and information relating to input(s)/output(s).

The subset of the plurality of types of data available concerning the system that is displayed may change depending on the alert type identified. In one implementation, the point in time is displayed on a timeline and selection of the point in time is made by moving a slider on the timeline to the point in time. Changing a time scale of the timeline can be used to enlarge or shrink a time window of the timeline.

DETAILED DESCRIPTION

The present invention generally relates to displaying data used to analyze system performance. The following description is presented to enable one of ordinary skill in the art to make and use the invention and is provided in the context of a patent application and its requirements. The present invention is not intended to be limited to the implementations shown, but is to be accorded the widest scope consistent with the principles and features described herein.

When problems occur in large software runtime environments, such as server environments, it is often difficult to diagnose the problems. The difficulty arises from the fact that any number of seemingly unrelated factors may interact and result in system failure, performance issue, or the like. Diagnosing system problems in large software runtime environments is also difficult because information useful in diagnosing the system problems may be stored in a variety of places. In addition, knowing which types of information are relevant for a particular problem in a system typically requires a deep understanding of the relationships and workings of the system.

Problems in a system sometimes result from timing, sequencing, and/or interactions between components of the system. Thus, it may be necessary to view and interpret numerous types of information concerning the system around the time a problem occurred in order to diagnose the problem. However, a big picture of what was happening in the system when the problem occurred may not be available because multiple viewers may need to be used to view the information relevant to the problem, the information displayed in the viewers may not be synchronized, and the viewers may only display information for a specific point in time.

Figure 1:
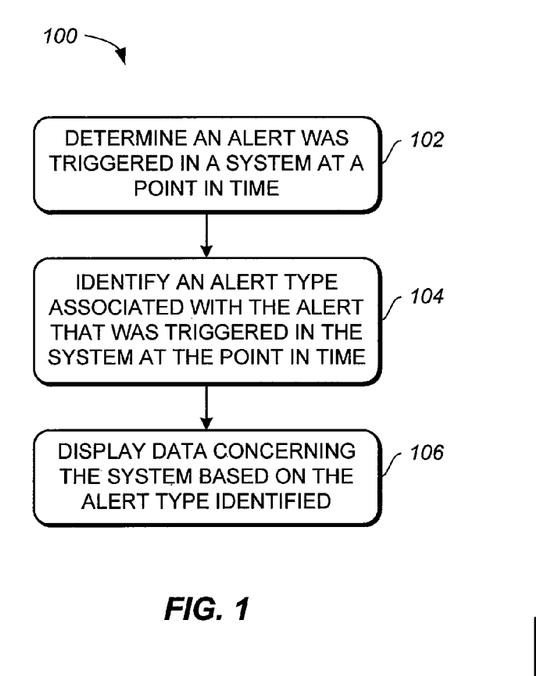
FIG. 1 depicts a process for displaying data used to analyze system performance according to an implementation of the invention.

Depicted in FIG. 1 is a process 100 for displaying data used to analyze system performance according to an implementation of the invention. At 102, an alert is determined to have been triggered in a system at a point in time. The system may be configured such that one or more alerts are triggered in the system when one or more conditions are satisfied. For example, an alert may be triggered when an event exceeds a threshold (e.g., a response to a request takes longer than 30 seconds), when an error is generated, when a warning is generated, or the like.

At 104, an alert type associated with the alert that was triggered in the system at the point in time is identified. The alert type associated with the alert may be based on, for instance, a type of event associated with the alert, the type of condition associated with the alert, and so forth. At 106, data concerning the system is displayed based on the alert type identified.

The data displayed includes a subset of a plurality of types of data available concerning the system, where the subset is selected based on the alert type identified. The plurality of types of data may include, for instance, information relating to processor(s), information relating to transaction(s), information relating to page(s), information relating to cache(s), information relating to log(s), information relating to command(s), information relating to throughput, and information relating to input(s)/output(s), and so forth. Hence, as an example, information relating to log(s) may not be displayed for an alert type because log type of data may not be useful in analyzing that type of alert.

In one implementation, the display of data concerning the system involves displaying data concerning the system for a window of time. Users may be allowed to configure the window of time by shrinking or enlarging a time span for the window of time (e.g., 5 minute span, 1 hour span, 12 hour span, etc.) and changing a time period for the window of time (e.g., 1pm-2pm, 9am-10am, and so forth).

The window of time may be defined such that a beginning of the window of time is a first predetermined period of time before the point in time and an ending of the window of time is a second predetermined period of time after the point in time. The first predetermined period of time and the second predetermined period of time may be the same. Additionally, the first and second predetermined periods of time may each be user configurable.

Each type of data displayed is time synchronized in one implementation. If a piece of data displayed is highlighted, then details regarding the piece of data highlighted may be displayed as well. For example, if the display of system data includes names of queries submitted and one of the query names is highlighted (e.g., using a pointing device and selecting the query name), then the code for the highlighted query may also be displayed so that the query can be analyzed for errors.

By selecting types of data to display based on type of alert to be analyzed, users no longer need to have extensive experience with a system to analyze problems in the system. In addition, by displaying the selected types of data together, synchronizing the different types of data, and displaying data for a period of time rather than a single point in time, analysis of system performance is simplified as users will be able to get an overview of what was happening in the system around the time a problem occurred.

Figure 2:
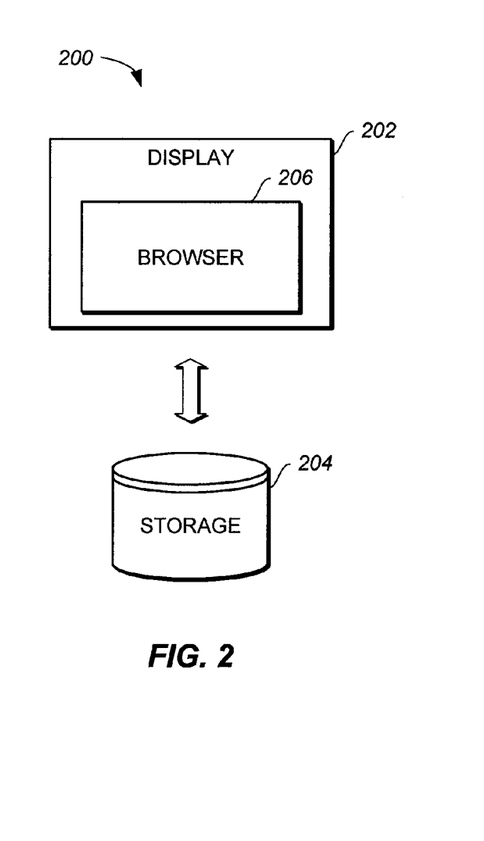
FIG. 2 illustrates a system according to an implementation of the invention.

FIG. 2 illustrates a system 200 according to an implementation of the invention. System 200 includes a display 202, a storage 204, and a browser 206 in display 202. Display 202 may be, for instance, a liquid crystal display (LCD), a cathode ray tube (CRT) display, or the like. Storage 204 may be, for instance, a hard disk, memory, or the like. Storage 204 stores a plurality of types of data concerning system 200.

Browser 206 may be an application executing on a processor (not shown) in system 200. Browser 206 may be a standalone application or integrated into a larger application (e.g., database application). System 200 may include other components (not shown), such as a processor, additional storage, and so forth.

In one implementation, browser 206 determines that an alert was set off in system 200 at a point in time, identifies an alert type associated with the alert that was set off in system 200 at the point in time, and displays data concerning system 200 based on the alert type identified. The data displayed by browser 206 comprises a subset of the plurality of types of data concerning system 200 stored in storage 204. The subset is selected based on the alert type identified.

Figure 3A:
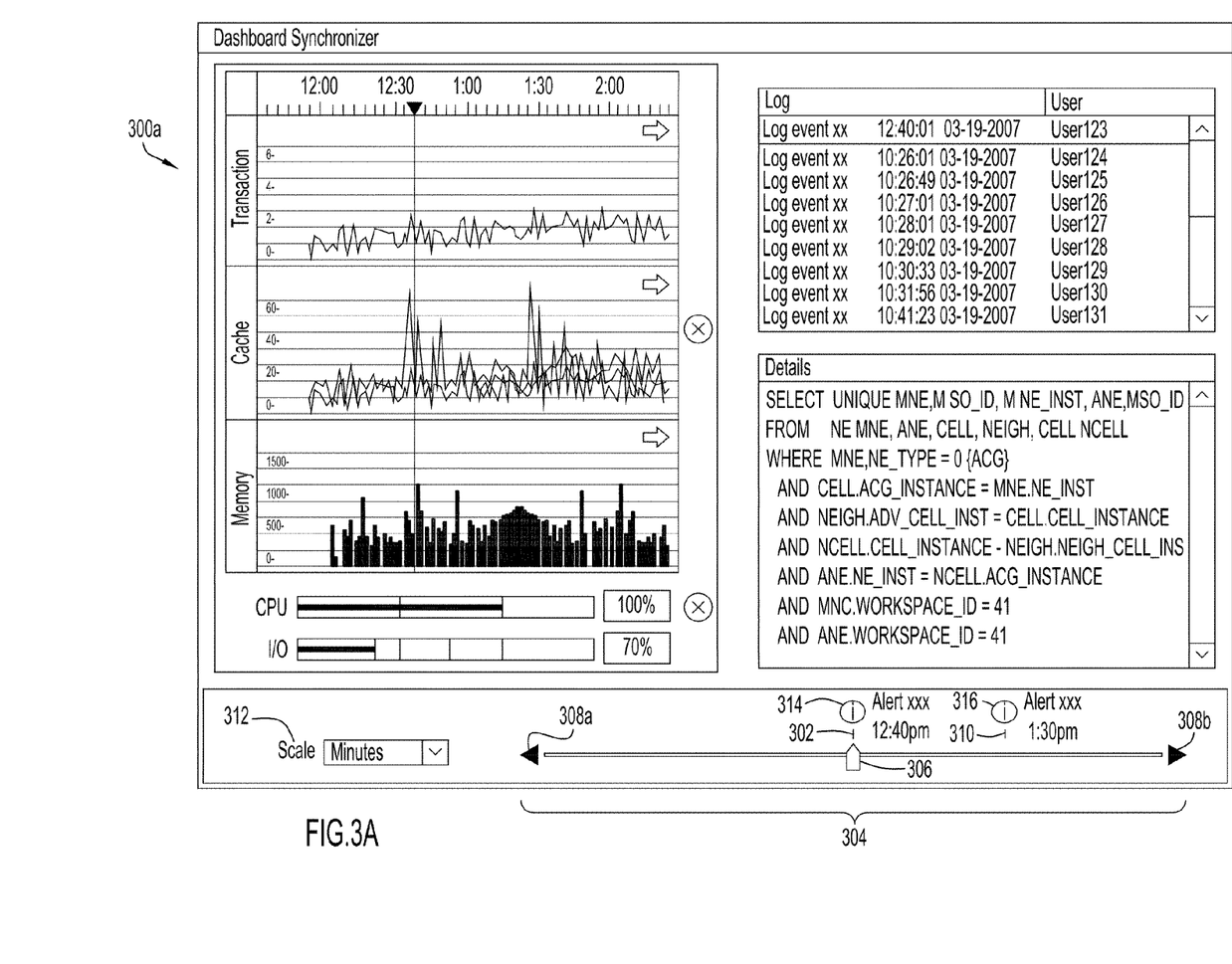
FIGS. 3A-3B show sample screenshots of a browser according to various implementations of the invention.
Figure 3B:
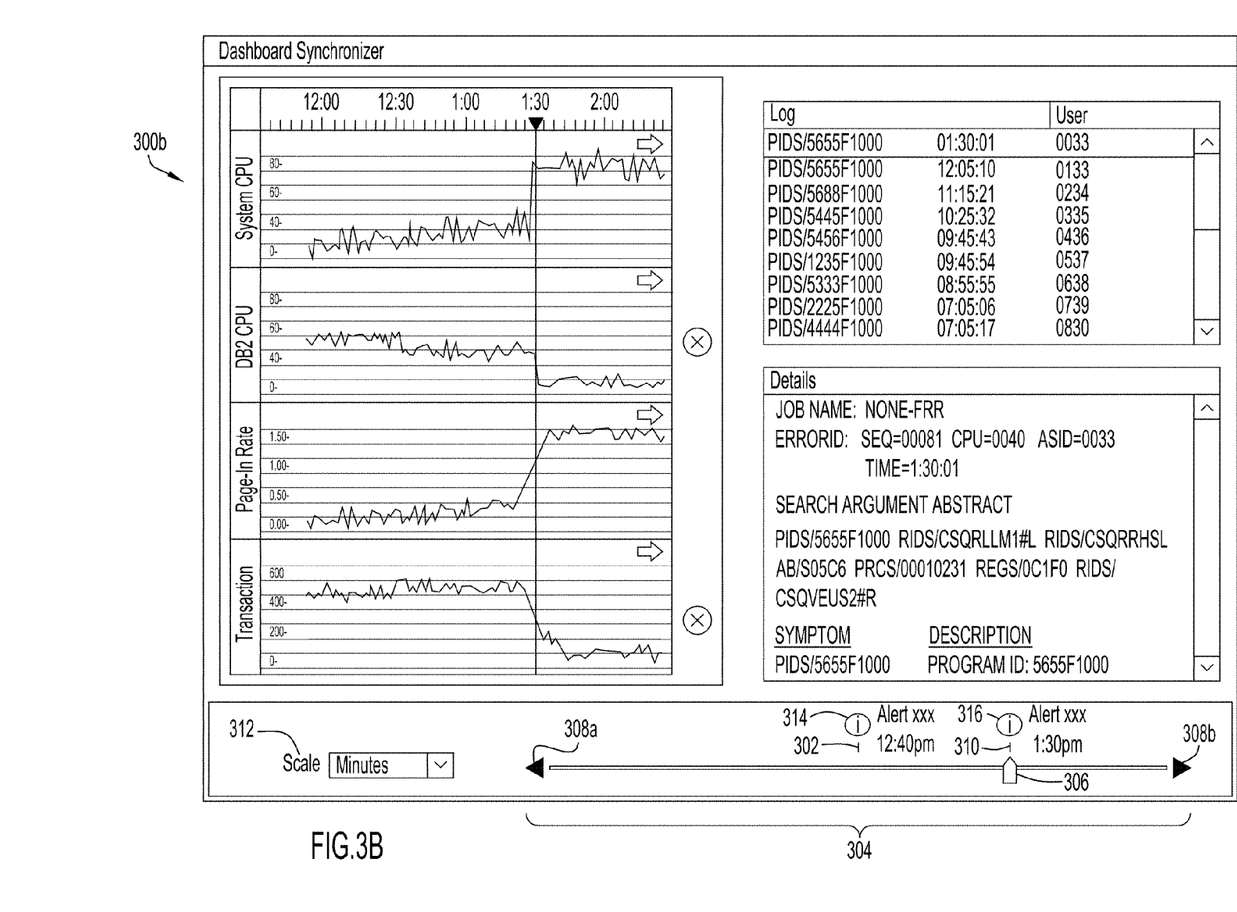

Shown in FIGS. 3A-3B are sample screenshots 300a and 300b for browser 206 in system 200 according to various implementations of the invention. In screenshot 300a, a first point in time 302 has been selected. As shown in FIGS. 3A-3B, the first point in time 302 is displayed on a timeline 304 and selected by moving a slider 306 to the first point in time 302. A time period of timeline 304 can be changed by clicking on arrows 308a-308b.

A second point in time 310 is also displayed on timeline 304. In FIGS. 3A-3B, minutes has been selected as a time scale 312 for timeline 304. In one implementation, changing time scale 312 of timeline 304 changes a time span of timeline 304 (e.g., 1 hour). For example, changing time scale 312 to seconds can shrink the time span of timeline 304 (e.g., to 5 minutes) while changing time scale 312 to hours can enlarge the time span of timeline 304 (e.g., to 12 hours). The time span of timeline 304 for each value selected for time scale 310 may be user configurable.

In sample screenshots 300a-300b, an alert 314 was triggered at the first point in time 302. Based on an alert type associated with alert 314, a subset of the plurality of types of data available concerning system 200 is displayed by browser 206. In FIG. 3A, the types of data displayed for the alert type associated with alert 314 include memory usage, cache usage, number of transactions, CPU (Central Processing Unit) usage, input/output usage, and event logs.

As seen in FIG. 3A, the data displayed for certain types of data includes data over a period of time and not just the first point in time 302 selected. In addition, the various types of data displayed are time synchronized. Furthermore, details relating to one of the event log entries are shown in FIG. 3A because the one event log entry is highlighted.

In sample screenshot 300b, the second point in time 310 has been selected by moving slider 306. An alert 316 was triggered at the second point in time 310. A different subset of the plurality of types of data available concerning system 200 is displayed by browser 206 because the alert type associated with alert 316 is different from the alert type associated with alert 314.

Similar to the types of data displayed in screenshot 300a, the types of data displayed n screenshot 300b are time synchronized. In addition, the data displayed for the various types of data includes data over a period of time.

The way in which various types of data are displayed in browser 206 may be configurable. For example, log type data may be displayed on the left side of browser 206 rather than on the right side. In addition, users may be allowed to select specific types of alerts to display on timeline 304.

Further, although it is not shown in FIGS. 3A-3B, color can be used to draw a user's attention to certain thresholds for errors or warnings. As an example, the color red can be used to show excess CPU usage or excess I/O in screenshot 300a.

A timeline based browser allows users to scroll through an integrated view of events, variable statuses/values, actions, and so forth taking place in a system. The information displayed is synchronized in time, which may be accomplished using timestamps. Users are able to move through time before and after an alert by moving a slider on a timeline to view system performance measures, action logs, commands issued, and so forth. How various system resources impact each other can also be analyzed using the browser by observing interactions over time. This is useful in setting system values to optimize performance.

To give an example as to how a browser, such as browser 206 illustrated in FIG. 2, can be used, assume throughput of a database system has slowed down or halted, which triggered an alert and/or error message. An operator can diagnose the problem by using the browser to inspect performance measures and action logs leading up to the alert. The operator may discover that a database statement was submitted right before the alert and upon further investigation, determine that the database statement caused the throughput of the database system to slow down.

Figure 4:
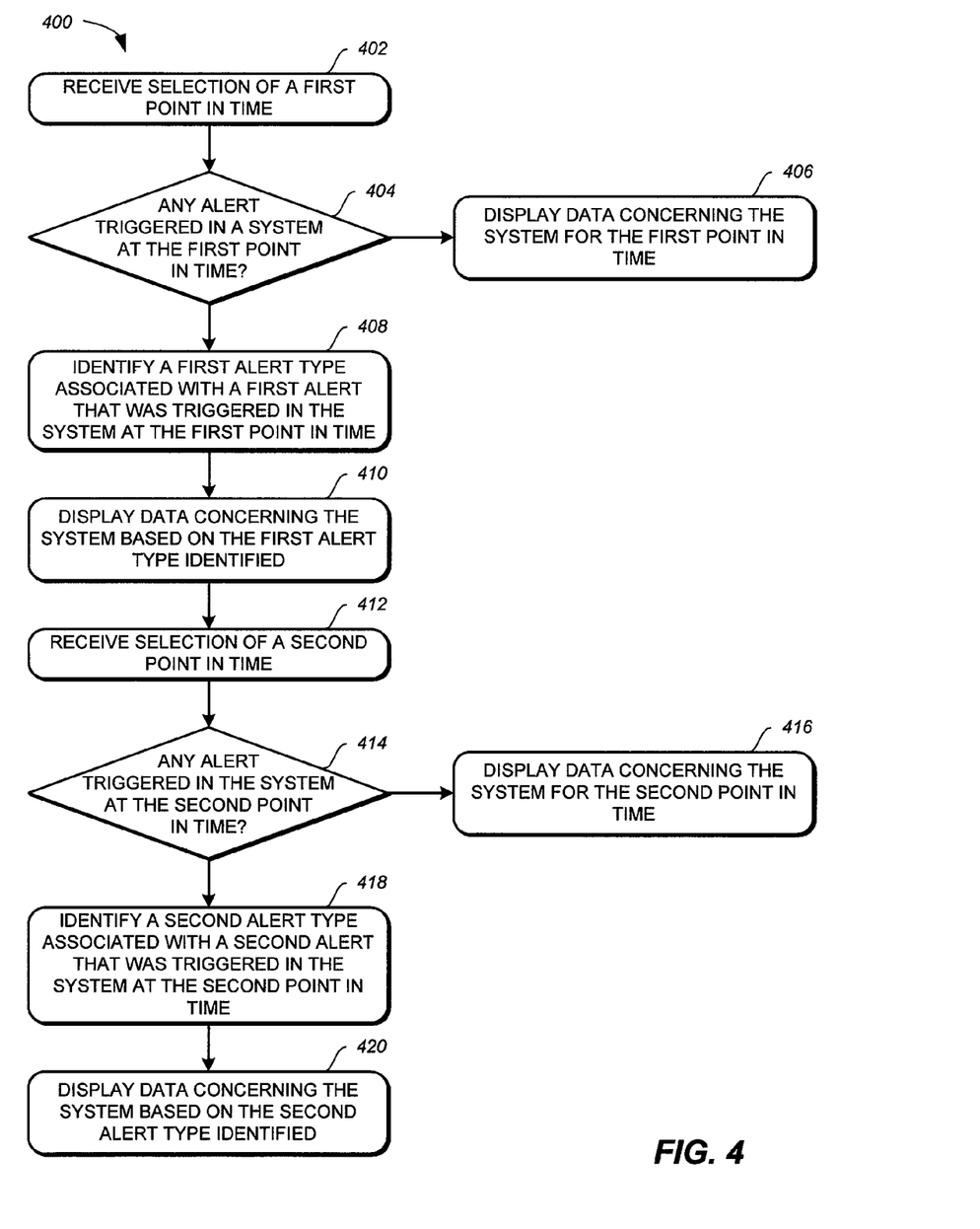
FIG. 4 is a process for displaying data used to analyze system performance according to an implementation of the invention.

FIG. 4 depicts a process 400 for displaying data used to analyze system performance according to an implementation of the invention. At 402, selection of a first point in time is received. A determination is made at 404 as to whether any alert was triggered in a system at the first point in time. If no alert was triggered in the system at the first point in time, then data concerning the system for the first point in time is displayed at 406. The data displayed includes a default subset of a plurality of types of data available concerning the system. The default subset may be the same as a subset that was displayed for another point in time previously selected.

However, if a first alert was triggered at the first point in time, then a first alert type associated with the first alert triggered at the first point in time is identified at 408. Data concerning the system is displayed at 410 based on the first alert type identified. The data displayed based on the first alert type includes a first subset of the plurality of types of data available concerning the system. The first subset is selected based on the first alert type identified.

A selection of a second point in time is received at 412. At 414, a determination is made as to whether any alert was triggered in the system at the second point in time. If no alert was triggered in the system at the second point in time, then data concerning the system for the second point in time is displayed at 416. The data displayed includes the default subset of the plurality of types of data available concerning the system.

On the other hand, if a second alert was triggered at the second point in time, then a second alert type associated with the second alert triggered at the second point in time is identified at 418. Data concerning the system is displayed at 420 based on the second alert type identified. The data displayed based on the second alert type includes a second subset of the plurality of types of data available concerning the system. The second subset is selected based on the second alert type identified.

The second subset differs from the first subset when the second alert type differs from the first alert type. Hence, each alert type can be associated with a unique subset of the plurality of types of data available concerning the system. The subset for each alert type may be predefined. In addition, the subset for each alert type may be user configurable.

The invention can take the form of an entirely hardware implementation, an entirely software implementation, or an implementation containing both hardware and software elements. In one aspect, the invention is implemented in software, which includes, but is not limited to, application software, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk—read-only memory (CD-ROM), and compact disk—read/write (CD-R/W).

Figure 5:
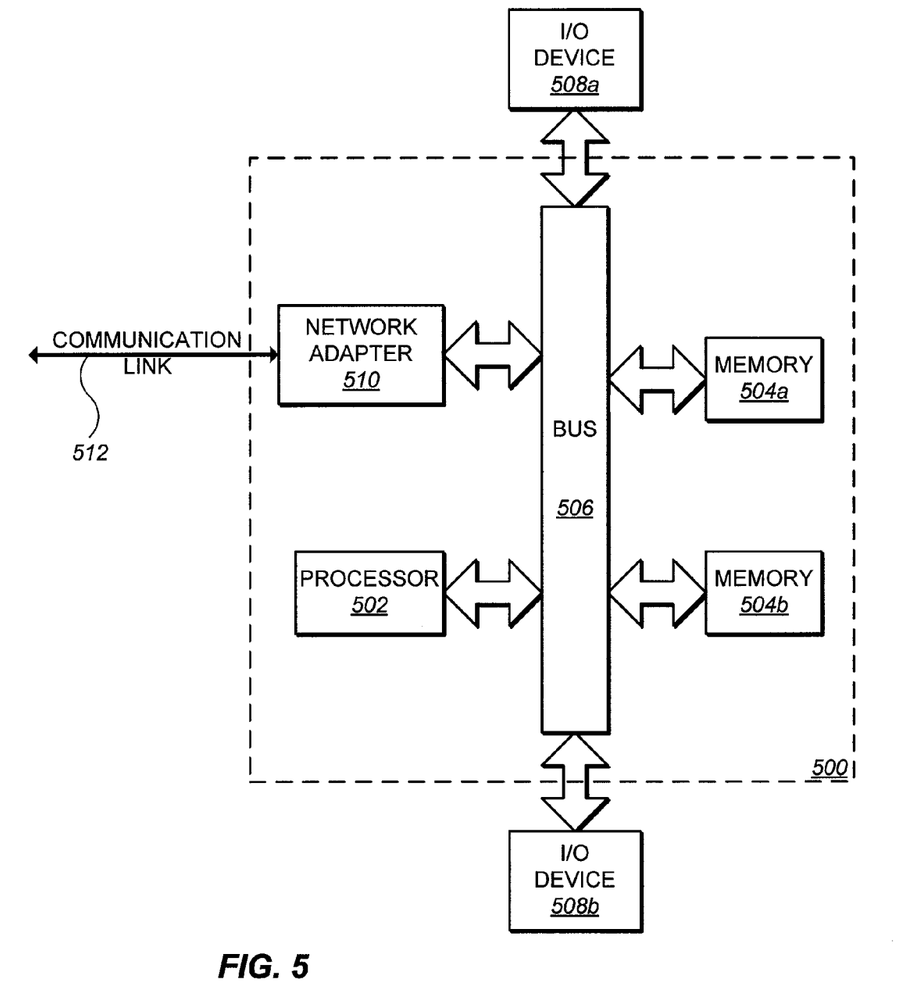
FIG. 5 depicts a block diagram of a data processing system with which implementations of the invention can be implemented.

FIG. 5 depicts a data processing system 500 suitable for storing and/or executing program code. Data processing system 500 includes a processor 502 coupled to memory elements 504$a$-$b$ through a system bus 506. In other implementations, data processing system 500 may include more than one processor and each processor may be coupled directly or indirectly to one or more memory elements through a system bus.

Memory elements 504$a$-$b$ can include local memory employed during actual execution of the program code, bulk storage, and cache memories that provide temporary storage of at least some program code in order to reduce the number of times the code must be retrieved from bulk storage during execution. As shown, input/output or I/O devices 508$a$-$b$ (including, but not limited to, keyboards, displays, pointing devices, etc.) are coupled to data processing system 500. I/O devices 508$a$-$b$ may be coupled to data processing system 500 directly or indirectly through intervening I/O controllers (not shown).

In the implementation, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

While various implementations for displaying data used to analyze system performance have been described, the technical scope of the present invention is not limited thereto. For example, the present invention is described in terms of particular systems having certain components and particular methods having certain steps in a certain order. One of ordinary skill in the art, however, will readily recognize that the methods described herein can, for instance, include additional steps and/or be in a different order, and that the systems described herein can, for instance, include additional or substitute components. Hence, various modifications or improvements can be added to the above implementations and those modifications or improvements fall within the technical scope of the present invention.

The invention claimed is:

1. A method for displaying data used to analyze system performance, wherein the system includes a plurality of different alert types, the method comprising:
associating each alert type with a set of information prior to triggering of the alert types, wherein each set of information includes a portion of information collected by the system and relevant to a cause of triggering that particular alert type, and wherein at least two alert types are each associated with a different set of information corresponding to a different portion of the collected information;
collecting information concerning performance of the system and relevant to the cause of triggering the alert types;
determining a first alert was triggered in the system at a first point in time selected by a user;
examining the first alert and identifying a first alert type associated with the first alert that was triggered in the system at the first point in time based on the type of conditions for triggering the first alert;
retrieving the set of information associated with the identified first alert type from the collected information; and
displaying the retrieved set of information concerning performance of the system and relevant to the cause of triggering the first alert type, wherein different sets of information are displayed for at least two different alert types and the retrieved set of information is displayed without remaining portions of the collected information.

2. The method of claim 1, wherein displaying the retrieved set of information comprises:
displaying the retrieved set of information for a window of time.

3. The method of claim 1, further comprising:
determining a second alert was triggered in the system at a second point in time;
identifying a second alert type associated with the second alert that was triggered in the system at the second point in time and retrieving the set of information associated with the identified second alert type from the collected information; and
displaying the retrieved set of information concerning performance of the system and relevant to the cause of triggering the second alert type.

4. The method of claim 3, wherein the set of information for the second alert type differs from the set of information for the first alert type when the second alert type differs from the first alert type.

5. The method of claim 3, further comprising:
displaying the first point in time and the second point in time on a timeline, wherein selection of the first point in time is made by moving a slider on the timeline to the first point in time and selection of the second point in time is made by moving the slider on the timeline to the second point in time.

6. The method of claim 5, further comprising:
changing a time scale of the timeline to enlarge or shrink a time window of the timeline.

7. The method of claim 1, wherein the retrieved set of information displayed is time synchronized.

8. The method of claim 1, further comprising:
responsive to a piece of the retrieved set of information displayed being highlighted, displaying details regarding the piece that is highlighted.

9. The method of claim 1, wherein the collected information comprises information relating to processor(s), information relating to transaction(s), information relating to page(s), information relating to cache(s), information relating to log(s), information relating to command(s), information relating to throughput, and information relating to input(s)/output(s).

10. A system including a plurality of different alert types comprising:
a display;
a storage storing collected information concerning performance of the system and relevant to a cause of triggering the alert types; and
a browser in the display, the browser:
associating each alert type with a set of information prior to triggering of the alert types, wherein each set of information includes a portion of information collected by the system and relevant to a cause of triggering that particular alert type, and wherein at least two alert types are each associated with a different set of information corresponding to a different portion of the collected information;
collecting information concerning performance of the system and relevant to the cause of triggering the alert types;
determining an alert was triggered in the system at a point in time selected by a user;
examining the alert and identifying an alert type associated with the alert that was triggered in the system at the point in time based on the type of conditions for triggering the alert and retrieving the set of information associated with the identified alert type from the collected information; and
displaying the retrieved set of information concerning performance of the system and relevant to the cause of triggering the identified alert type, wherein different sets of information are displayed for at least two different alert types and the retrieved set of information is displayed without remaining portions of the collected information.

11. The system of claim 10, wherein displaying the retrieved set of information comprises:
displaying the retrieved set of information for a window of time.

12. The system of claim 10, wherein the set of information retrieved and displayed changes depending on the alert type identified.

13. The system of claim 10, wherein the retrieved set of information displayed is time synchronized.

14. The system of claim 10, wherein, responsive to a piece of the retrieved set of information being highlighted, the browser further displays details regarding the piece that is highlighted.

15. The system of claim 10, wherein the collected information comprises information relating to processor(s), information relating to transaction(s), information relating to page(s), information relating to cache(s), information relating to log(s), information relating to command(s), information relating to throughput, and information relating to input(s)/output(s).

16. The system of claim 10, wherein the browser further displays the point in time on a timeline, selection of the point in time being made by moving a slider on the timeline to the point in time.

17. A computer program product comprising a computer readable memory device, the computer readable memory device including a computer program for displaying data used to analyze system performance, wherein the system includes a plurality of different alert types and, the computer program, when executed on a computer, causes the computer to:
associate each alert type with a set of information prior to triggering of the alert types, wherein each set of information includes a portion of information collected by the system and relevant to a cause of triggering that particular alert type, and wherein at least two alert types are each associated with a different set of information corresponding to a different portion of the collected information;
collect information concerning performance of the system and relevant to the cause of triggering the alert types;
determine a first alert was triggered in a system at a first point in time selected by a user;
examine the first alert and identify a first alert type associated with the first alert that was triggered in the system at the first point in time based on the type of conditions for triggering the first alert;
retrieving the set of information associated with the identified first alert type from the collected information; and
display the retrieved set of information concerning performance of the system and relevant to the cause of triggering the first alert type, wherein different sets of information are displayed for at least two different alert types and the retrieved set of information is displayed without remaining portions of the collected information.

18. The computer program product of claim 17, wherein display of the retrieved set of information comprises:
displaying the retrieved set of information for a window of time.

19. The computer program product of claim 17, wherein the computer program further causes the computer to:

determine a second alert was triggered in the system at a second point in time;

identify a second alert type associated with the second alert that was triggered in the system at the second point in time and retrieve the set of information associated with the identified second alert type from the collected information; and display the retrieved set of information concerning performance of the system and relevant to the cause of triggering the second alert type.

20. The computer program product of claim 19, wherein the set of information for the second alert type differs from the set of information for the first alert type when the second alert type differs from the first alert type.

21. The computer program product of claim 19, wherein the computer program further causes the computer to:

display the first point in time and the second point in time on a timeline, wherein selection of the first point in time is made by moving a slider on the timeline to the first point in time and selection of the second point in time is made by moving the slider on the timeline to the second point in time.

22. The computer program product of claim 21, wherein the computer program further causes the computer to:

change a time scale of the timeline to enlarge or shrink a time window of the timeline.

23. The computer program product of claim 17, wherein the retrieved set of information displayed is time synchronized.

24. The computer program product of claim 17, wherein, responsive to a piece of the retrieved set of information displayed being highlighted, the computer program further causes the computer to:

display details regarding the piece that is highlighted.

25. The computer program product of claim 17, wherein the collected information comprises information relating to processor(s), information relating to transaction(s), information relating to page(s), information relating to cache(s), information relating to log(s), information relating to command(s), information relating to throughput, and information relating to input(s)/output(s).

\* \* \* \* \*